US011183741B2

(12) United States Patent
Gaither

(10) Patent No.: US 11,183,741 B2
(45) Date of Patent: Nov. 23, 2021

(54) BATTERY PACK ASSEMBLIES HAVING ELONGATED TERMINAL CONNECTORS WITH KEYED SLOTS

(71) Applicant: Toyota Motor Engineering & Manufacturing North America, Inc., Plano, TX (US)

(72) Inventor: Geoffrey D. Gaither, Brighton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 101 days.

(21) Appl. No.: 16/789,829

(22) Filed: Feb. 13, 2020

(65) Prior Publication Data

US 2021/0257599 A1 Aug. 19, 2021

(51) Int. Cl.
| | |
|---|---|
| *B60K 1/04* | (2019.01) |
| *H01M 50/543* | (2021.01) |
| *H01M 50/20* | (2021.01) |
| *H01M 50/10* | (2021.01) |

(52) U.S. Cl.
CPC .............. *H01M 50/543* (2021.01); *B60K 1/04* (2013.01); *H01M 50/20* (2021.01); *B60K 2001/0455* (2013.01); *H01M 50/10* (2021.01); *H01M 2220/20* (2013.01)

(58) Field of Classification Search
CPC ............................ H01M 50/543; H01M 50/20
See application file for complete search history.

(56) References Cited

U.S. PATENT DOCUMENTS

| | | | | | |
|---|---|---|---|---|---|
| 4,835,407 | A | * | 5/1989 | Kataoka | B60R 25/04 180/287 |
| 6,157,091 | A | * | 12/2000 | Yoshida | H02J 13/00036 307/10.1 |
| 6,538,341 | B1 | * | 3/2003 | Lang | H02J 7/35 307/18 |

(Continued)

FOREIGN PATENT DOCUMENTS

| | | |
|---|---|---|
| CN | 105340105 A | 2/2016 |
| CN | 105914335 A | 8/2016 |

(Continued)

*Primary Examiner* — James A Shriver, II
*Assistant Examiner* — James J Triggs
(74) *Attorney, Agent, or Firm* — Dinsmore & Shohl LLP

(57) ABSTRACT

A battery pack assembly includes a battery pack having a plurality of battery cells and an elongated terminal connector. Each battery cell having at least one terminal. The elongated terminal connector having at least one keyed slot corresponding to each of the at least one terminal. Each keyed slot having a first opening and a second opening. A first width of the first opening is greater than a second width of the second opening. The elongated terminal connector is configured to move between an engaged position and a disengaged position. In the engaged position each terminal of the at least one terminal is positioned within the second opening to engage each terminal with the elongated terminal connector. In the disengaged position each terminal of the at least one terminal is positioned within the first opening to disengaged each terminal from the elongated terminal connector.

20 Claims, 8 Drawing Sheets

(56) References Cited

U.S. PATENT DOCUMENTS

| | | | |
|---|---|---|---|
| 6,743,545 B2 * | 6/2004 | Huang | H01M 50/213 |
| | | | 429/96 |
| 6,762,572 B1 * | 7/2004 | Ishii | B60L 1/00 |
| | | | 318/139 |
| 2007/0009787 A1 * | 1/2007 | Straubel | H01M 50/502 |
| | | | 429/99 |
| 2009/0139781 A1 * | 6/2009 | Straubel | B60L 50/64 |
| | | | 180/65.1 |
| 2016/0185223 A1 * | 6/2016 | Kim | H01M 50/20 |
| | | | 429/100 |

FOREIGN PATENT DOCUMENTS

| | | |
|---|---|---|
| CN | 206697544 U | 12/2017 |
| KR | 20110067027 A | 6/2011 |
| KR | 20140125194 A | 10/2014 |

* cited by examiner

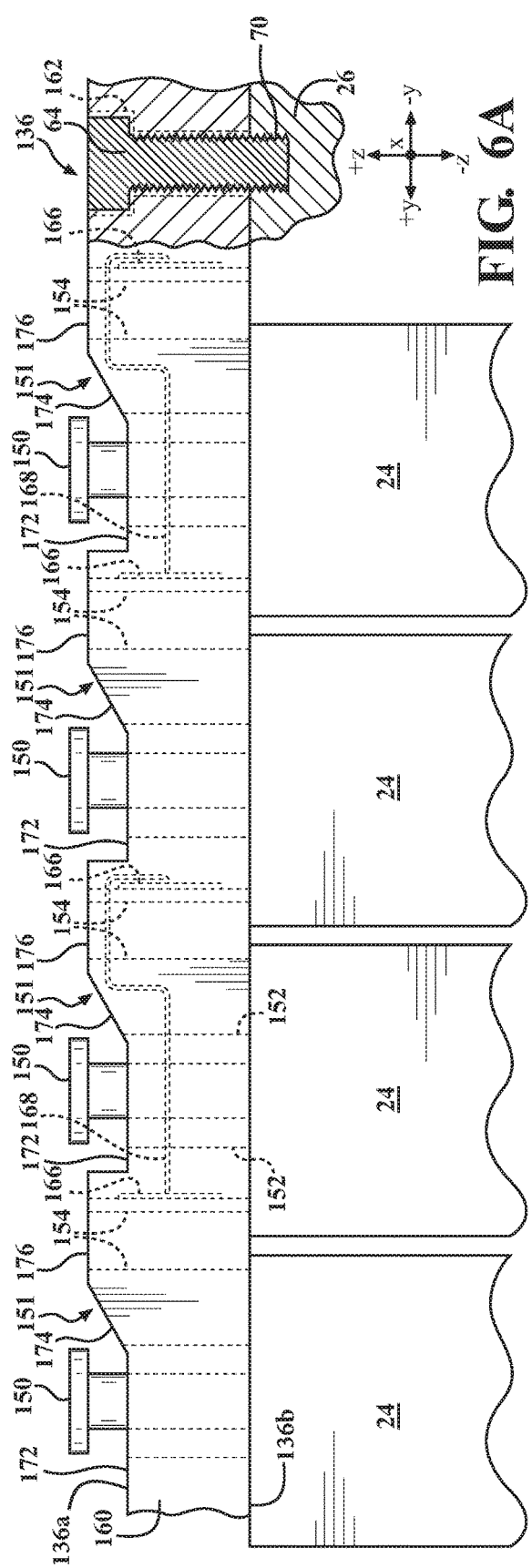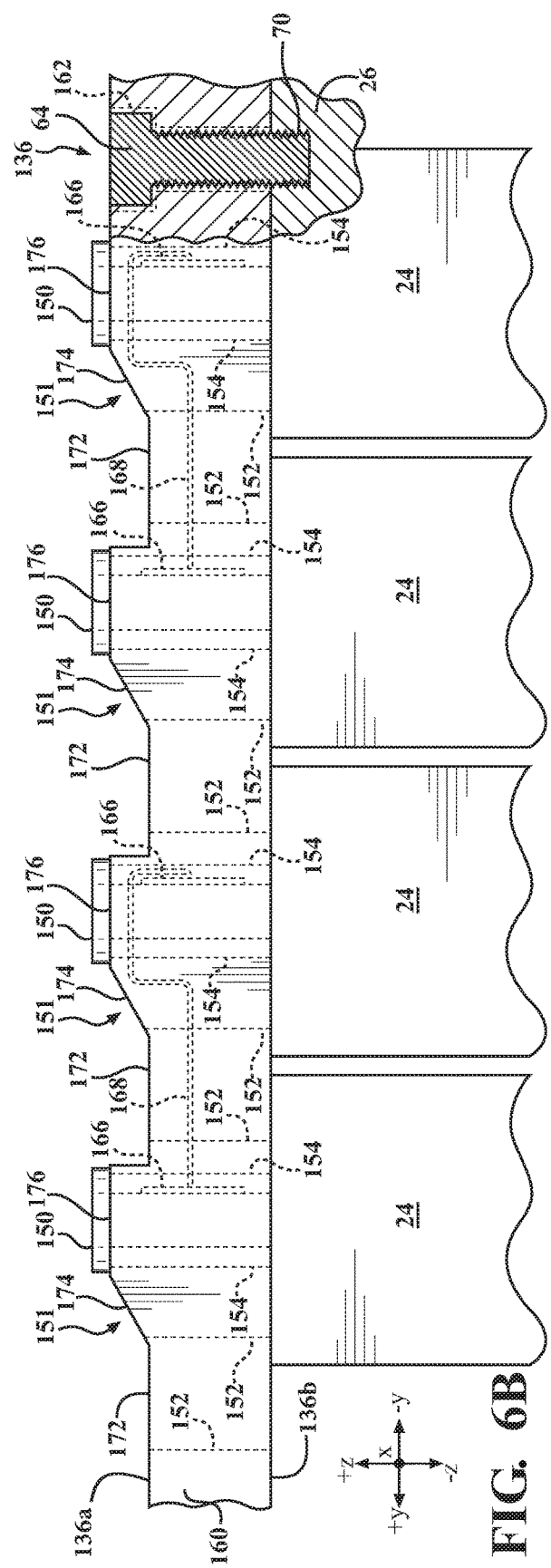

BATTERY PACK ASSEMBLIES HAVING ELONGATED TERMINAL CONNECTORS WITH KEYED SLOTS

TECHNICAL FIELD

The present specification generally relates to a battery pack assemblies and, more specifically, to battery pack assemblies having elongated terminal connectors with keyed slots.

BACKGROUND

Hybrid electric vehicles include battery packs, which may include a stack of battery cells and a bus bar module provided on top of the stack of battery cells. The bus bar module is generally configured to carry a voltage and current to a component of the vehicle (e.g., a powertrain component of the vehicle). Each of the plurality of cells may include a pair of externally threaded terminals, and the bus bar module may include a plurality of housings that each includes a terminal plate for connecting to the terminals of the cells and a bus bar. The terminal plates of the bus bar module are secured to the externally threaded terminals of the plurality of cells by nuts. To gain access to the individual battery cell, all of the nuts along the length of the bus bar module must be removed in order to remove the bus bar module.

Accordingly, a need exists for a device that enables quick access for removal of each battery cell within the battery pack while providing voltage and current from the battery pack to a component of the vehicle.

SUMMARY

In one embodiment, a battery pack assembly includes a battery pack having a plurality of battery cells and an elongated terminal connector. Each battery cell having at least one terminal. The elongated terminal connector having at least one keyed slot corresponding to each of the at least one terminal. Each keyed slot having a first opening and a second opening. A first width of the first opening is greater than a second width of the second opening. The elongated terminal connector is configured to move between an engaged position and a disengaged position. In the engaged position each terminal of the at least one terminal is positioned within the second opening to engage each terminal with the elongated terminal connector. In the disengaged position each terminal of the at least one terminal is positioned within the first opening to disengaged each terminal from the elongated terminal connector.

In another embodiment, a vehicle includes a battery pack positioned within the vehicle. The battery pack includes a plurality of battery cells and an elongated terminal connector. Each battery cell having at least one terminal. The elongated terminal connector extends across a length of the battery pack. The elongated terminal connector includes at least one keyed slot. Each keyed slot of the at least one keyed slot includes a first opening and a second opening, and a first width of the first opening is greater than a second width of the second opening. The elongated terminal connector is configured to move between an engaged position and a disengaged position.

in the engaged position each terminal of the at least one terminal is positioned within the second opening to engage each terminal with the elongated terminal connector, and in the disengaged position each terminal of the at least one terminal is positioned within the first opening to disengaged each terminal from the elongated terminal connector.

In yet another embodiment, a method of removing an individual battery cell from a battery pack is provided. The battery pack includes a plurality of battery cells. Each battery cell includes at least one terminal. The method includes removing a first pair of fasteners from an elongated terminal connector, where the elongated terminal connector includes at least one keyed slot. Each keyed slot of the at least one keyed slot includes a first opening and a second opening. A first width of the first opening is greater than a second width of the second opening, and each keyed slot of the at least one keyed slot receives a corresponding terminal of the at least one terminal. The method also includes displacing the elongated terminal connector linearly in a first direction such that each terminal of the at least one terminal is aligned with the first opening of each keyed slot of the at least one keyed slot. The method includes removing the elongated terminal connector from around the terminal of the battery cell when each terminal of the at least one terminal is aligned with the first opening of each keyed slot of the at least one keyed slot. The method includes removing the individual battery cell from the battery pack.

These and additional objects and advantages provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 6A schematically depicts a partial side view of another example elongated terminal connector in a disengaged position according to one or more embodiments described herein;

FIG. 6B schematically depicts a partial side view of the elongated terminal connector of FIG. 6A in an engaged position according to one or more embodiments described herein;

DETAILED DESCRIPTION

Embodiments described herein generally relate to a battery pack assembly including a battery pack. The battery pack includes a plurality of battery cells, where each battery cell includes a terminal side and an opposite cover side. At least one terminal extends from each of the plurality of battery cells on the terminal side. An elongated terminal connector extends across the length of the battery pack, where the elongated terminal connector includes at least one keyed slot. Each keyed slot of the at least one keyed slot includes a first opening and a second opening, and a first width of the first opening is less than a second width of the second opening. Each keyed slot of the at least one keyed slot receives a corresponding terminal of the at least one terminal.

The elongated terminal connector is configured to move between an engaged position and a disengaged position. When the elongated terminal connector moves from the engaged position to the disengaged position, a position of each terminal of the at least one terminal changes from being within the first opening to being within the second opening. In the engaged position, each terminal of the at least one terminal is positioned within the second opening to engage each terminal with the elongated terminal connector. In the disengaged position each terminal of the at least one terminal is positioned within the first opening to disengaged each terminal from the elongated terminal connector.

The elongated terminal connector is secured to the battery pack assembly by a pair of fasteners. As such, in the engaged position, the elongated terminal connectors retain the plurality of battery cells within the battery pack assembly. In the disengaged position, the pair of fasteners are removed and such that the elongated terminal connectors are removed from the battery pack assembly, thereby permitting each battery cell of the plurality of battery cells to be easily and quickly released from the battery pack assembly.

Furthermore, the first and second openings each include an edge portion. The edge portion is conductive such that in the engaged position, the elongated terminal connector is electrically coupled to each of the plurality of battery cells via the respective terminal. As such, the elongated terminal connector electrically connects each battery cell of the plurality of battery cells in a series configuration to transmit energy stored within each battery cell of the plurality of battery cells to a component of a vehicle while replacing a conventional bus bar module.

As used herein, the term "communicatively coupled" means that coupled components are capable of exchanging data signals with one another such as, for example, electrical signals via conductive medium or a non-conductive medium, and the like.

Figure 1:
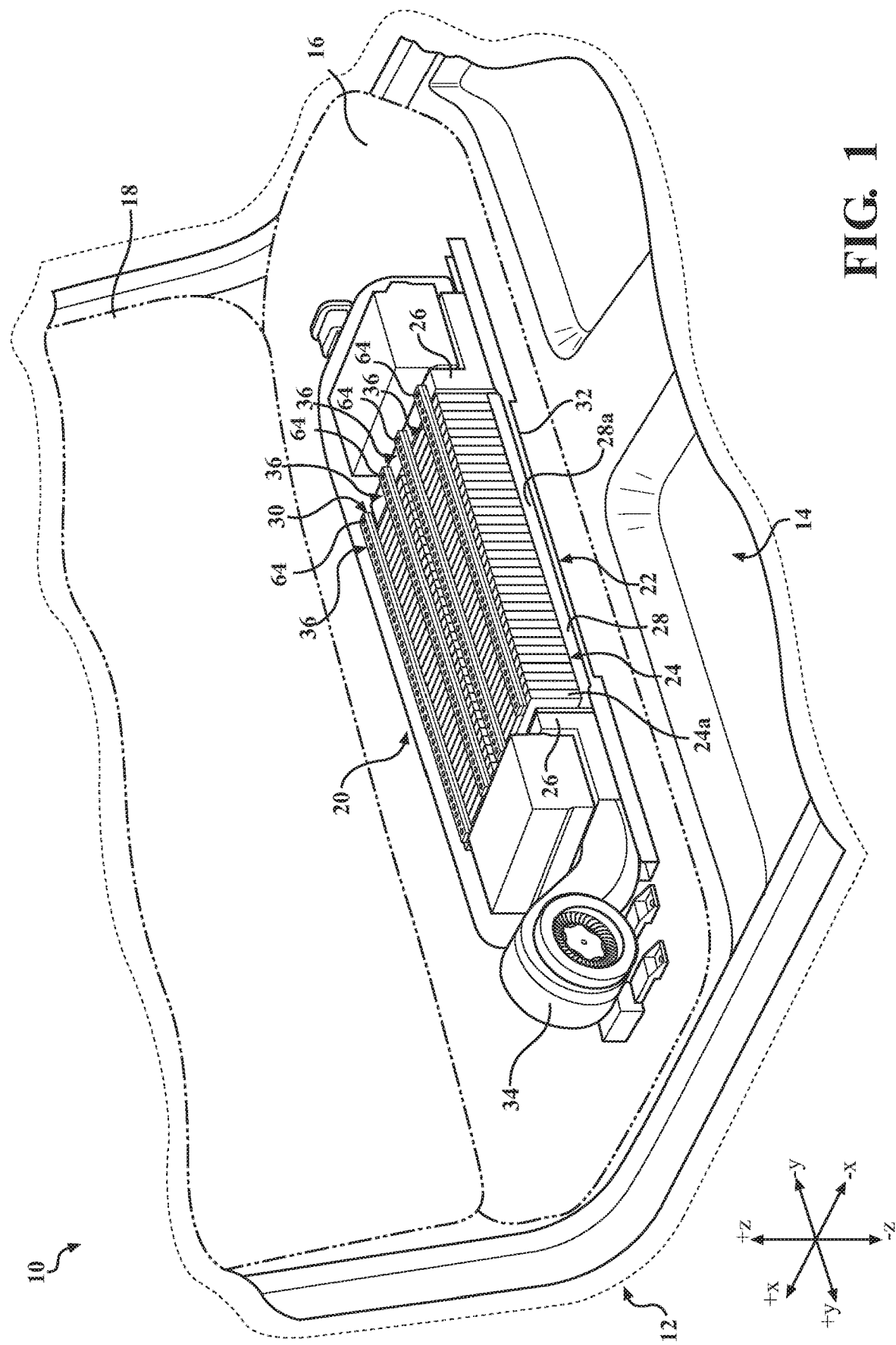
FIG. 1 schematically depicts a partial perspective view of a vehicle and a battery pack assembly according to one or more embodiments shown or described herein.

As used herein, the term "longitudinal direction" refers to the forward-rearward direction of the battery pack (i.e., in the +/− vehicle Y-direction depicted in FIG. 1). The term "lateral direction" refers to the cross-direction of the battery pack (i.e., in the +/− vehicle X-direction depicted in FIG. 1), and is transverse to the longitudinal direction. The term "vertical direction" or "up" or "above" refer to the upward-downward direction of the battery pack (i.e., in the +/− vehicle Z-direction depicted in FIG. 1).

Vehicles that incorporate elements according to the present disclosure may include a variety of construction methodologies that are conventionally known, including a unibody construction methodology as well as a body-on-frame construction methodology. It should be understood that vehicles that are constructed with body-on-frame or unibody construction may incorporate the elements that are shown and described herein. Furthermore, the vehicle may be a hybrid vehicle, an electric vehicle, a conventional vehicle, and the like.

Figure 2:
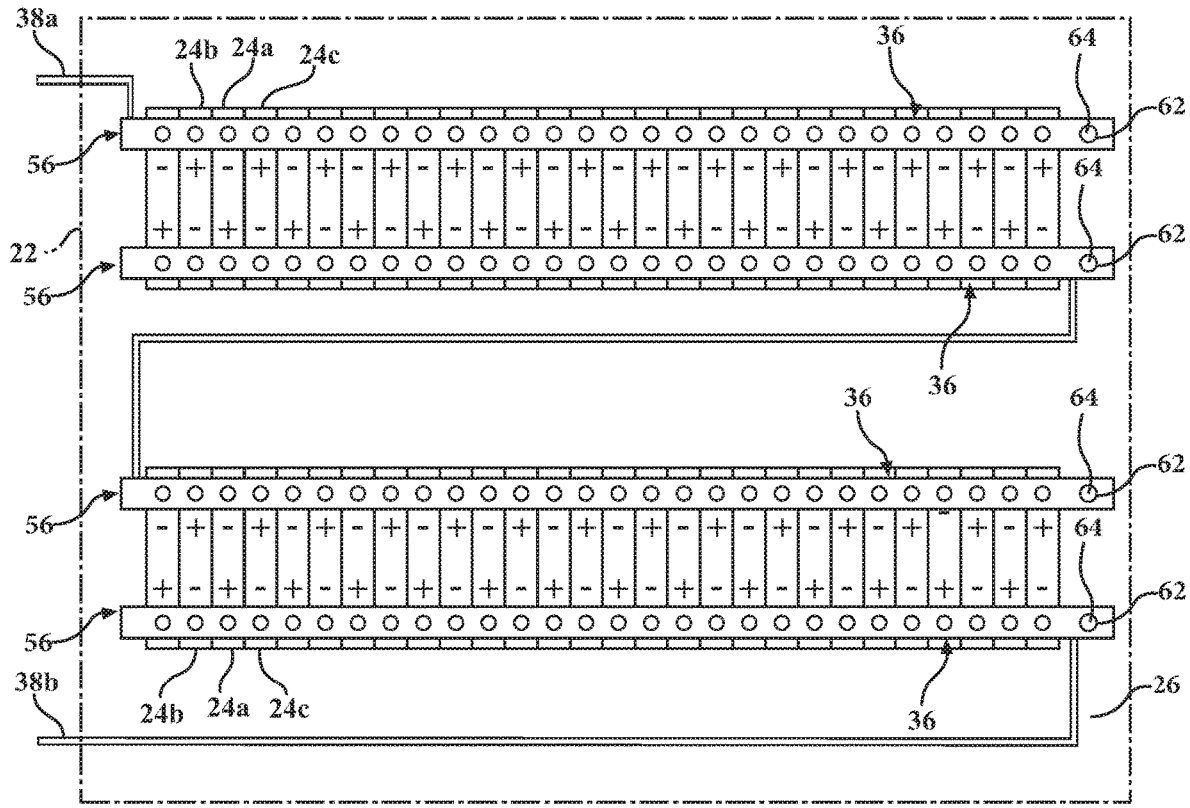
FIG. 2 schematically depicts a top view of the battery pack assembly of FIG. 1 according to one or more embodiments shown or described herein.
Figure 3:
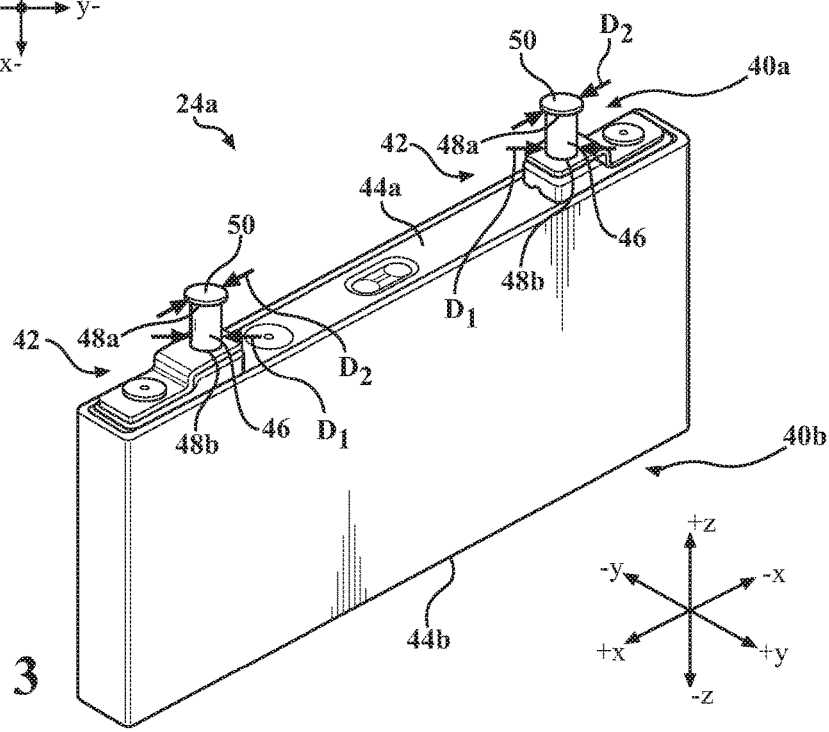
FIG. 3 schematically depicts a perspective view of a battery cell of the battery pack assembly of FIG. 1 according to one or more embodiments described herein.

Referring to FIGS. 1-3, a vehicle 10 including a passenger compartment 12 is shown. The passenger compartment 12 includes a seat and a seat frame 14. The seat frame 14 incudes a seat portion 16 and a seat back portion 18. A battery pack assembly 20 is positioned within the seat portion 16 of the seat frame 14. It should be appreciated that the battery pack assembly 20 may be positioned anywhere within the passenger compartment 12, an engine compartment, and the like, within the vehicle 10.

The battery pack assembly 20 includes a housing 22 that houses a plurality of battery cells 24. It should be appreciated that while the plurality of battery cells 24 are illustrated as being in two rows in the lateral direction (i.e. in the +/−X direction), the plurality of battery cells 24 may be positioned within the housing 22 in a plurality of configurations and arrangements in other embodiments. As a non-limiting example, the plurality of battery cells 24 may be positioned within the housing 22 in a column configuration or in the longitudinal direction (i.e., in the +/−Y direction). The housing 22 includes a pair of end retaining walls 26 and a pair of side retaining walls 28 that define a housing interior portion 30 that includes a floor surface 32. In some embodiments, the end retaining walls 26 and the side retaining walls 28 each extend in the vertical direction (i.e., in the +/−Z direction). Further, in some embodiments, the end retaining walls 26 each extend in the vertical direction (i.e., in the +/−Z direction) a greater distance than the side retaining walls 28. The side retaining walls 28 further include an outer surface 28a that is positioned outside of each of the plurality of battery cells 24 positioned within the housing interior portion 30 of the housing 22.

The battery pack assembly 20 further includes a cooling mechanism 34. The cooling mechanism 34 forces airflow above and/or beneath each battery cell 24a of the plurality of battery cells 24 to cool the plurality of battery cells 24.

The battery pack assembly 20 further includes elongated terminal connectors 36 extending across a length of the plurality of battery cells 24 in the longitudinal direction (i.e., in the +/−Y direction). It should be appreciated that the elongated terminal connectors 36 extend in a direction transverse to the plurality of battery cells 24. As a non-limiting example, in the column configuration, the elongated terminal connectors 36 extend in the longitudinal direction (i.e., in the +/−Y direction). As another non-liming example, when the plurality of battery cells 24 are arranged in a row configuration, as shown in FIG. 1, the elongated terminal connectors 36 extend in the longitudinal direction (i.e., in the +/−Y direction).

The elongated terminal connectors 36 assist in retaining the plurality of battery cells 24 within the housing 22. Further, the elongated terminal connectors 36 provide a conductive medium such that an energy stored in of each of the plurality of battery cells 24 may be carried through the elongated terminal connectors 36 to a different component of the vehicle 10, such as a powertrain, an inverter, and the like, as discussed in greater detail herein.

Each of the plurality of battery cells 24 are communicatively coupled in series with each other. It should be understood that each row is communicatively coupled to other rows such that each battery cell 24a of the plurality of battery cells 24 are communicatively coupled in series. As such, adjacent battery cells 24b, 24c of the plurality of battery cells 24 are positioned or arranged such that the polarity of the adjacent battery cells 24b, 24c is reversed compared to the adjacent battery cell 24b. That is, in a non-liming example, the battery cell 24a is arranged within the housing 22 with a positive terminal nearest to the outer surface 28a of the side retaining walls 28 of the housing 22 while a negative terminal is nearest to the housing interior portion 30 of the housing 22. The adjacent battery cells 24b, 24c are each arranged within the housing 22 with a positive terminal nearest to the housing interior portion 30 of the housing 22 while a negative terminal is nearest to the outer surface 28a of the side retaining walls 28 of the housing 22. As such, it is understood that the positive terminal of each of the plurality of battery cells 24 alternates such that every other battery cell has the same positive terminal polarity arrangement, and the same applies for each negative terminal of the plurality of battery cells 24.

A pair of load wires 38a, 38b are communicatively coupled to the elongated terminal connectors 36 such that an energy stored within the plurality of battery cells 24 may be transferred from the plurality of battery cells 24 to another component of the vehicle 10 via the elongated terminal connectors 36 and the pair of load wires 38a, 38b. It should be understood that the energy stored and/or transferred may be a voltage, a current, a power, and the like. It should be appreciated that the pair of load wires 38a, 38b may be a busbar, a wire, or other conductive medium that transfers the energy stored within the plurality of battery cells 24 to the components of the vehicle 10. In some embodiments, the component of the vehicle 10 may be a powertrain component. In other embodiments, the vehicle component is an inverter, a relay, fuses, other electrical components, and the like.

Referring now to FIG. 3, an isolated view of the battery cell 24a of the plurality of battery cells 24 is schematically depicted. It should be understood that while only the battery cell 24a of the plurality of battery cells 24 is described, the features apply to each battery cell of the plurality of battery cells 24. The battery cell 24a includes a terminal side 40a and an opposite housing side 40b. Further, the battery cell 24a includes a terminal surface 44a, on the terminal side 40a and a housing surface 44b that, in some embodiments, abuts the floor surface 32 of the housing 22. In other embodiments, the housing surface 44b is adjacent to the floor surface 32 of the housing 22. As such, in this embodiment, the battery cell 24a may not be in contact with the floor surface 32 of the housing 22. In other embodiments, portions of the housing surface 44b are in contact with portions of the floor surface 32 of the housing 22.

In some embodiments, a pair of terminals 42 extends from the terminal surface 44a of the battery cell 24a. One of the pair of terminals 42 is generally known as a positive terminal, and the other terminal of the pair of terminals 42 is generally known as a negative terminal. The pair of terminals 42 are each provided with a post 46 that extends upwardly from the terminal surface 44 of the battery cell 24a in the vertical direction (i.e., in the +/−Z direction). In some embodiments, the post 46 may be generally cylindrical and has a post diameter D1. In other embodiments, the post 46 may be a square, a rectangle, an octagon, and the like. As such, it should be appreciated that the post 46 may be a uniform shape or a non-uniform shape. Further, in some embodiments, each post 46 of the pair of terminals 42 extends an equal length from the terminal surface 44 in the vertical direction (i.e., in the +/−Z direction). In other embodiments, one post 46 of the pair of terminals 42 extends from the terminal surface 44a in the vertical direction (i.e., in the +/−Z direction), a different height that the other post 46 of the pair of terminals 42. As a non-limiting example, each negative post may extend a height greater than the positive posts in the vertical direction (i.e., in the +/−Z direction). In other embodiments, each positive post may extend a height greater than the negative posts in the vertical direction (i.e., in the +/−Z direction).

Furthermore, in various embodiments, some battery cells of the plurality of battery cells 24 may extend a height greater than the other battery cells of the plurality of battery cells 24 in the vertical direction (i.e., in the +/−Z direction). As a non-limiting example, one row of battery cells of the plurality of battery cells 24 may be at a height greater than the other battery cells of the plurality of battery cells 24 in other rows in the vertical direction (i.e., in the +/−Z direction). In other embodiments, some battery cells within a row in the lateral direction (i.e., in the +/−Y direction) may also be at a height greater than the other battery cells in the same row in the vertical direction (i.e., in the +/−Z direction). As a non-limiting example, every other battery cell may be at a height greater than the adjacent battery cell in the vertical direction (i.e., in the +/−Z direction). It should be understood that the above are non-limiting examples and that each battery cell of the plurality of battery cells may be in any configuration in any direction, such as angled, in varying heights, and the like.

Each post 46 of the pair of terminals 42 includes a distal end 48a and a proximate end 48b. The proximate end 48b abuts the terminal surface 44a. The distal end 48a is opposite the proximate end 48b. A flange 50 extends radially outward from the distal end 48 of the post 46. In some embodiments, the flange 50 may be generally circular and has a flange diameter D2. In other embodiments, the flange 50 may be a square, a rectangle, an octagon, and the like. As such, it should be appreciated that the flange 50 may be a uniform shape or a non-uniform shape. The flange diameter D2 may be larger than the post diameter D1 of each post 46.

The size and shape of the battery cell 24a may depend on predetermined specifics such as the amount of energy to be stored, a temperature response of the battery cell, an amount of energy the vehicle requires, and the like. As such, the type of the battery cell 24a may vary. In some embodiments, the battery cell 24a is lithium ion (LI-Ion). In other embodiments, the battery cell 24a is a Molten Salt (Na—NiCl2), a Nickel Metal Hydride (Ni-MH), a Lithium Sulphur (Li—S), and the like.

Now referring back to FIGS. 1-3, the elongated terminal connectors 36 will now be described. The elongated terminal connectors 36 extend along the terminal side 40a of the plurality of battery cells 24 in a direction, or pattern, transverse to the pair of terminals 42 of each battery cell 24a of the plurality of battery cells 24. That is, in some embodiments, when the pair of terminals 42 are arranged along the terminal surface 44a in the lateral direction (i.e., in the +/−X direction), the elongated terminal connectors 36 extend in the longitudinal direction (i.e., in the +/−Y direction). In other embodiments, when the pair of terminals 42 are arranged along the terminal surface 44a in the longitudinal direction, (i.e., in the +/−Y direction), as illustrated, the elongated terminal connectors 36 extend in the lateral direction (i.e., in the +/−X direction).

In various embodiments, the elongated terminal connectors 36 each include an upper surface 36a and an opposite lower surface 36b that faces the terminal surface 44a of the plurality of battery cells 24. In some embodiments, the lower surface 36b is in contact with the terminal surface 44a of the plurality of battery cells 24.

Figure 4:
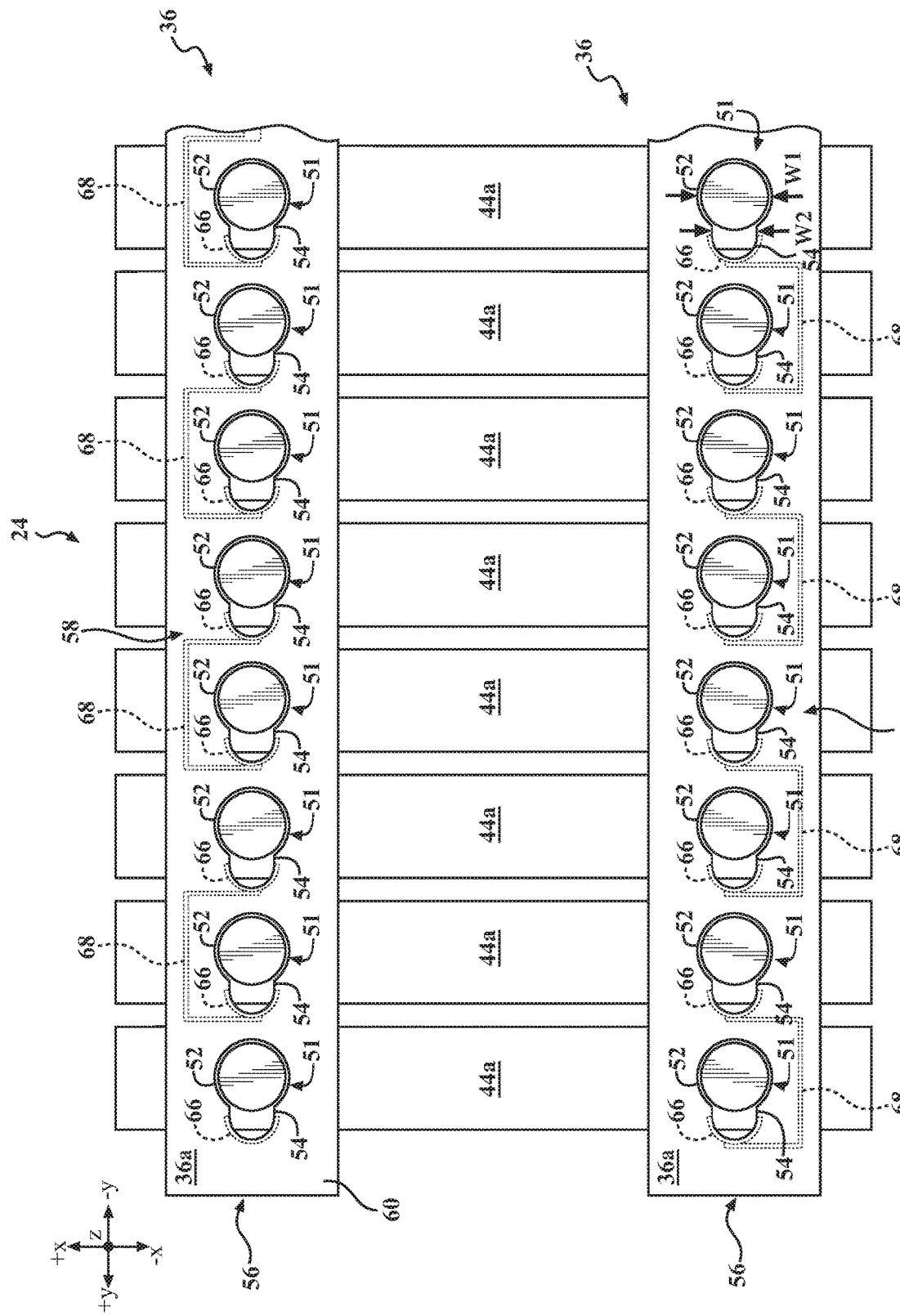
FIG. 4 schematically depicts a partial isolated top view of the battery pack assembly of FIG. 1 with a pair of elongated terminal connectors in a disengaged position according to one or more embodiments described herein.
Figure 5:
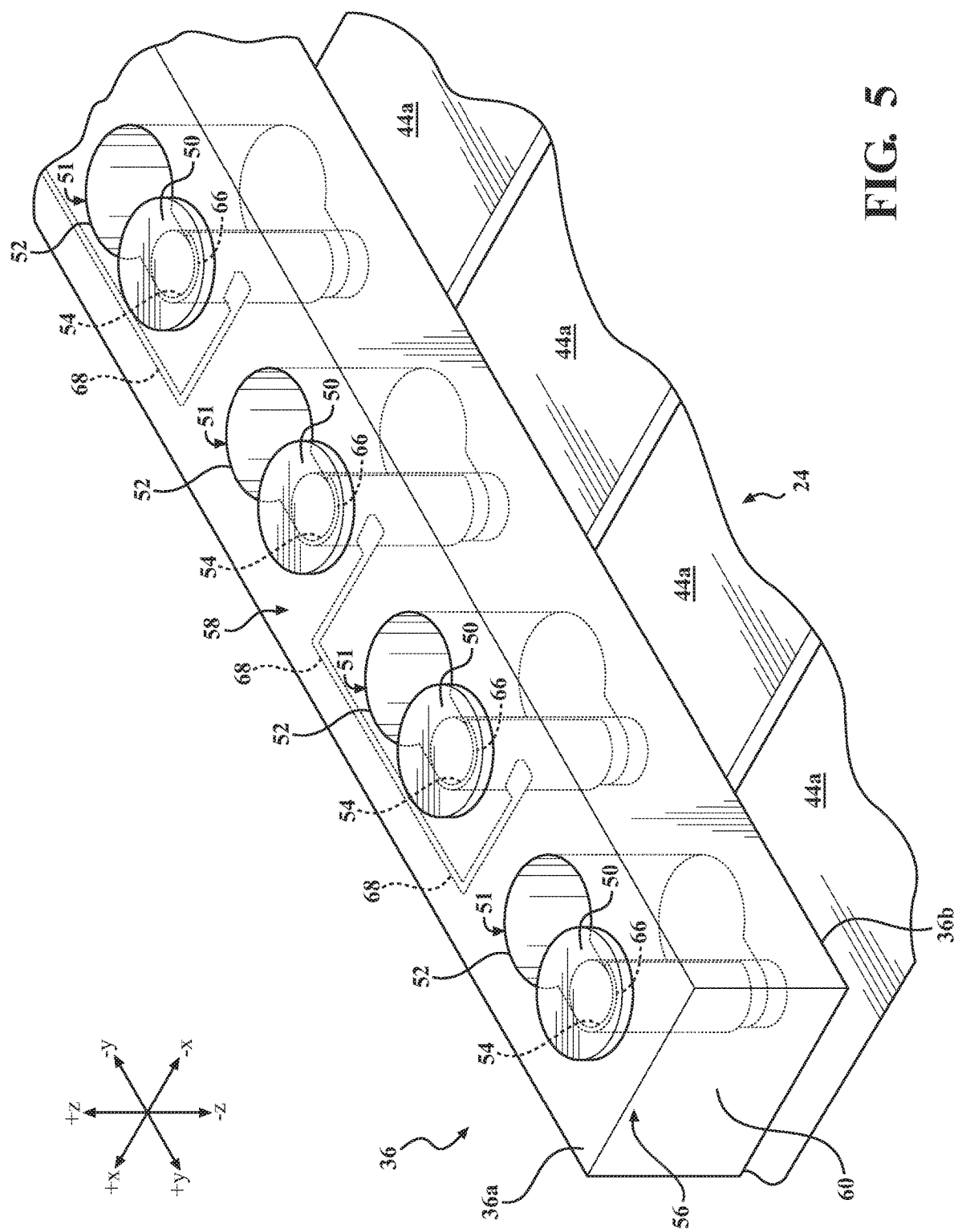
FIG. 5 schematically depicts a partial perspective view of the elongated terminal connector of FIG. 4 in an engaged position according to one or more embodiments described herein.

The elongated terminal connectors 36 include a plurality of keyed slots 51. Each of the plurality of keyed slots 51 includes a first opening 52 and a second opening 54. In some embodiments and as illustrated in FIGS. 4-5, each first opening 52 and each second opening 54 has a generally circular or semicircular shape. It should be understood that at least one of the first openings 52 and/or at least one of the second openings 54 illustrated in FIGS. 4-5 may have a non-spherical shape in other embodiments, such as a square shape, a rectangular shape, an octagonal shape, and the like.

In some embodiments, each first opening 52 and each second opening 54 of the plurality of keyed slots 51 extends through a thickness T1 of the elongated terminal connectors 36 between the upper surface 36a and the lower surface 36b. While the thickness T1 between the upper surface 36a and the lower surface 36b is shown as uniform along the entirety of the elongated terminal connectors 36 in the longitudinal direction (i.e., in the +/−Y direction), the thickness T1 may be non-uniform in the longitudinal direction (i.e., in the +/−Y direction) in other embodiments. As a non-limiting example, the thickness T1 may be greater at each end 56 of the elongated terminal connectors 36 than a middle portion 58 of the elongated terminal connectors 36.

The first opening 52 has a first width W1, and the second opening 54 has a second width W2. In some embodiments, the first width W1 is greater than the second width W2. In some embodiments, the first width W1 and the second width W2 are greater than the diameter D1 of the post 46, thereby enabling the post 46 to linearly move within the first opening 52 and the second opening 54 in the longitudinal direction (i.e., in the Y direction). In various embodiments, the first width W1 is greater than the diameter D2 of the flange 50, thereby enabling an operator to lift the elongated terminal connectors 36 in the vertical direction (i.e., in the +/−Z direction) and remove the elongated terminal connectors 36 from the plurality of battery cells 24 when the post 46 is positioned within the first opening 52, as described below in further detail. In some embodiments, the second width W2 is less than the diameter D2 of the flange 50, thereby inhibiting an operator from lifting the elongated terminal connectors 36 in the vertical direction (i.e., in the +/−Z direction) and removing the elongated terminal connectors 36 from the plurality of battery cells 24 when the post 46 is positioned within the second opening 54, as described below in further detail.

The elongated terminal connectors 36 may include an insulating portion 60 that is generally formed of an insulating material. In some embodiments, the insulating material is a thermoplastic such as a polyetheretherketone (PEEK), a plastic such as polypropylene, polyvinyl chloride (PVC), Polybutylene Terephthalate (PET), and the like. It should be appreciated that, in some embodiments, the elongated terminal connectors 36 may have a plurality of layers of the thermoplastic material, the plastic material, and the like, arranged in the vertical direction (i.e., in the +/−Z direction) with different materials between the layers, such as a conductive material, as discussed in greater detail herein.

With reference to FIGS. 1 and 2, the elongated terminal connectors 36 include at least one opening 62 positioned at one end 56 of the elongated terminal connectors 36. The at least one opening 62 is configured to receive a fastener 64 such as a bolt, a screw, a rivet, and the like. In some embodiments, the at least one opening 62 is internally threaded to assist in retaining the fastener 64. In other embodiments, the at least one opening 62 is a through hole. As described in greater detail below, the fastener 64 is received within an aperture formed in the end retaining walls 26 to secure the elongated terminal connectors 36 to the housing 22. In some embodiments, the opening 62 extends between the upper surface 36a and the lower surface 36b and the opening 62 may be internally threaded to engage the fastener 64. In some embodiments, the aperture formed in the end retaining walls 26 of the housing is internally threaded to engage the fastener 64. The opening 62 aligns with the aperture when the elongated terminal connectors 36 are in an engaged position as described below. The engagement of the fastener 64 within the opening 62 and the aperture positions the elongated terminal connectors 36 in a locked position. In the locked the position, the elongated terminal connectors 36 are locked into the engaged position such that the elongated terminal connectors 36 are inhibited from being linearly displaced in the longitudinal direction from the engaged position to the disengaged position and the elongated terminal connectors 36 are inhibited from moving in the vertical direction.

The elongated terminal connectors 36 move between a disengaged position, as shown in FIG. 4, and an engaged position, as shown in FIG. 5, as described in greater detail herein. In the engaged position, the elongated terminal connectors 36 engage and retain the plurality of battery cells 24. To achieve the engaged position, the elongated terminal connectors 36 are linearly displaced in the longitudinal direction (i.e., in the +/−Y direction) such that the each of posts 46 of the pair of terminals 42 of each battery cell 24 engage with respective second openings 54 of the elongated terminal connectors 36. In the engaged position, the posts 46 are received within the second openings 54 such that the flange 50 inhibits the movement of the elongated terminal connectors 36 from moving in the vertical direction (i.e., in the +/−Z direction) as lower surface of the flange 50 abuts the upper surface 36a of the elongated terminal connector 36. Specifically, as the diameter D2 of the flange 50 is greater than the width W2 of the second opening 54, the elongated terminal connectors 36 are retained to the battery cells 24.

Furthermore, in the engaged position, edge portions 66 of the second openings 54 are in contact with each post 46 of the pair of terminals 42 such that each post 46 is retained against each of the edge portions 66 of the second openings 54. In some embodiments, a portion of each of the edge portions 66 is conductive. In some embodiments, the conductive portion of the edge portions 66 may be an annular ring or partial annular ring within each of the second openings 54. In the embodiments described herein, in the engaged position, the elongated terminal connectors 36 electrically couple to each of the plurality of battery cells 24 via each post 46 of the pair of terminals 42.

The conductive portion of each of the edge portions 66 is communicatively coupled to a respective conductive path 68, respectively, as discussed in greater detail herein. The conductive portion each of the edge portions 66 provides a path for transmitting the energy stored within each of the plurality of battery cells 24 to the pair of load wires 38a, 38b for use by components of the vehicle 10. As such, in some embodiments, the conductive portion of each of the edge portions 66 is a conductive metal material, such as silver (Ag), copper (Cu), gold (Au), aluminum (Al), beryllium (Be), calcium (Ca) magnesium (Mg), rhodium (Rh), sodium (Na), iridium (Ir), and/or the like.

In some embodiments, in the engaged position, the least one opening 62 are aligned such that the fastener 64 may extend through the elongated terminal connectors 36 such that the fastener 64 may be secured to the housing 22 via a retaining aperture. Further, in some embodiments each end 56 of the elongated terminal connectors 36 terminate equally at the end retaining walls 26 of the housing 22 in the engaged position. In other embodiments, each end 56 of the elongated terminal connectors 36 terminate in a staggered manner at the end retaining walls 26 of the housing 22 in the engaged position.

In the disengaged position, the elongated terminal connectors 36 can be removed from the battery pack assembly 20 to release the plurality of battery cells 24. That is, in the disengaged position, the post 46 of the pair of terminals 42 are received within respective first opening 52 of the plurality of keyed slots 51. In the disengaged position, the flange 50 passes through a respective first opening 52 such that the post 46 is positioned within first opening 52 and the flange 50 is positioned above the first opening 52 in the vertical direction (i.e., in the +/−Z direction). In the disengaged position, the posts 46 and flanges 50 of the terminals 42 are disengaged from the elongated terminal connectors 36 such that the posts 46 and the flanges 50 are spaced apart from the first openings 52 of the elongated terminal connectors 36 in order to inhibit electrical communication between the terminals 42 of the battery cells 24 and the elongated terminal connectors 36.

As discussed above, the edge portion 66 is communicatively coupled to the conductive path 68, which extends through the elongated terminal connector 36. As such, it should be appreciated that the conductive path 68 is communicatively coupled to each of the plurality of keyed slots 51 of the elongated terminal connector 36. The conductive path 68 is configured to carry the within each of the plurality of battery cells 24 to the pair of load wires 38*a*, 38*b* for use by the components of the vehicle 10. As such, in some embodiments, the conductive path 68 is a conductive metal material, such as silver (Ag), copper (Cu), gold (Au), aluminum (Al), beryllium (Be), calcium (Ca) magnesium (Mg), rhodium (Rh), sodium (Na), iridium (Ir), and/or the like.

In some embodiments, the conductive path 68 is positioned between the upper surface 36*a* and the lower surface 36*b* of the elongated terminal connector 36. That is, the conductive path 68 extends through the elongated terminal connector 36 such that the conductive path 68 is sandwiched between the insulating material of the insulating portion 60. As such, the conductive path 68 is electrically insulated from any component above or below, in front or behind, and on both sides of the elongated terminal connector 36. The conductive path 68 includes portions that extend in the lateral direction (i.e., in the +/−X direction) and in the longitudinal direction (i.e., in the +/−Y direction) and has a thickness in the vertical direction (i.e., in the +/−Z direction).

In various embodiments, the conductive path 68 in one of the elongated terminal connectors 36 is configured to communicatively couple a positive polarity terminal 42 from the battery cell 24*a* of the plurality of battery cells 24 to a negative polarity terminal 42 of the adjacent battery cell 24*c* of the plurality of battery cells 24. The conductive path 68 of the other one of the elongated terminal connectors 36 is configured to communicatively couple a negative polarity terminal 42 from the adjacent battery cell 24*a* of the plurality of battery cells 24 to a positive polarity terminal 42 of a second adjacent battery cell 24*c* of the plurality of battery cells 24.

As such, it should be understood that the conductive path 68 completes or closes an electrical circuit between adjacent battery cells of the plurality of battery cells 24 such that the conductive paths 68 of the elongated terminal connectors 36 daisy chain, or electrically positions the plurality of battery cells 24 into a series configuration. That is, the elongated terminal connectors 36 together electrically position the plurality of battery cells 24 into a series configuration such that the energy stored in each battery cell of the plurality of battery cells 24 is maximized for transfer to other components of the vehicle 10 through the conductive paths 68 and the pair of load wires 38*a*, 38*b*. In some embodiments, the conductive path 68 may further include a continuous portion (not shown) that extends the length of elongated terminal connectors 36 and which is communicatively coupled to the conductive path 68.

Figure 6C:
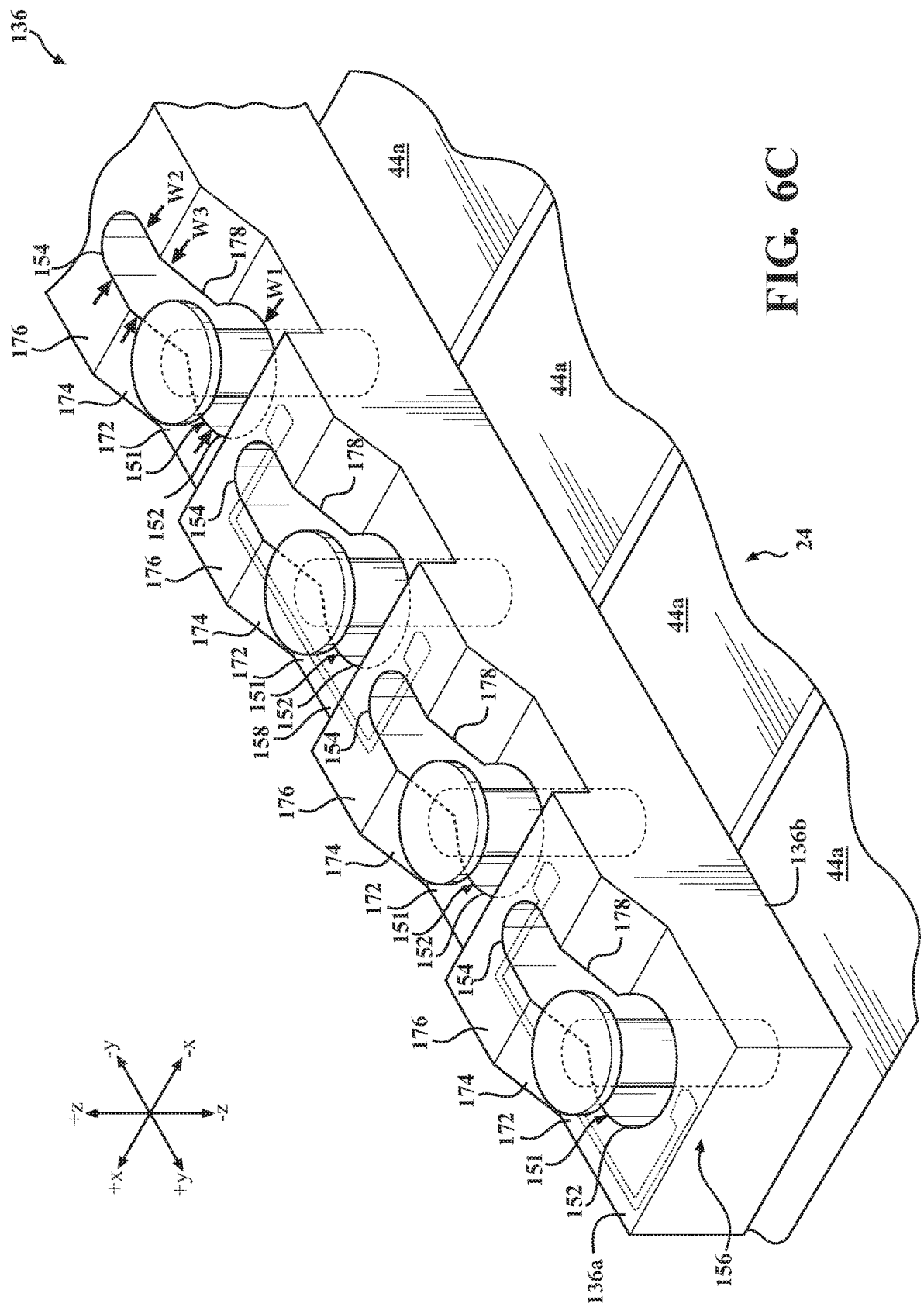
FIG. 6C schematically depicts a partial perspective view of the elongated terminal connector of FIG. 6A in the disengaged position according to one or more embodiments described herein.

Now referring to FIGS. 6A-6C, a second aspect of elongated terminal connectors 136 is schematically depicted. It is understood that the elongated terminal connectors 136 are similar to the elongated terminal connectors 36 with the exceptions of the features described herein. As such, like features will use the same reference numerals with a prefix "1" for the reference numbers. As such, for brevity reasons, these features will not be described again.

The elongated terminal connectors 136 include a plurality of keyed slots 151 having first openings 152 and second openings 154 similar to the plurality of keyed slots 51 having the first openings 52 and the second openings 54. The elongated terminal connectors 136 are similar to the elongated terminal connectors 36 except for the shape of the upper surface 136*a* of the elongated terminal connectors 136.

The upper surface 136*a* of the elongated terminal connectors 136 includes a plurality of first linear portions 172, a plurality of second linear portions 176, and a plurality of inclined portions 174. The inclined portions 174 extend between the first linear portions 172 and the second linear portions 176. The first openings 152 may be positioned on the first linear portions 172 of the elongated terminal connector 136, and the second openings 154 may be positioned on the second linear portions 176 of the elongated terminal connectors 136. The first linear portions 172 may have a uniform thickness T2, and the second linear portions 176 may have a uniform thickness T3. In some embodiments, the inclined portion 174 includes a connecting slot 178 positioned therein. The connecting slot 178 connects the first opening 152 to the second opening 154. The connecting slot 178 may have a width W3 that is greater than the diameter D1 of the post 46, thereby enabling the elongated terminal connector 136 to move between the engaged position and the disengaged position in response to a linear displacement. In some embodiments, the width W3 is equal to the width W2. When the elongated terminal connector 136 is set to the engaged position, the elongated terminal connectors 136 are linearly displaced in the longitudinal direction (i.e., in the +/−Y direction) such that a lower surface of the flange 50 abuts the upper surface 176*a* of the second linear portion 176 in the vertical direction (i.e., in the +/−Z direction). In the engaged position, the abutment of the lower surface of the flange 50 and the upper surface 176*a* of the second linear portion 176 retains the elongated terminal connectors 136 in the engaged position and inhibits an operator from removing the elongated terminal connectors 136 in the vertical direction.

Referring to FIGS. 6A and 6B, the elongated terminal connectors 136 includes openings 162 for receiving a fastener 64. The fastener 64 extends through the elongated terminal connectors 136 and is received within an aperture 70 formed in the end retaining walls 26 of the housing 22. In some embodiments, the openings 162 extend between the upper surface 136a and the lower surface 136b and the opening 162 may be internally threaded to engage the fastener 64. In some embodiments, the aperture 70 is internally threaded to engage the fastener 64. The opening 162 aligns with the aperture 70 when the elongated terminal connectors 136 are in the engaged position. The engagement of the fastener 64 within the opening 162 and the aperture 70 positions the elongated terminal connectors 136 in a locked position. In the locked the position, the elongated terminal connectors 136 are locked into the engaged position such that the elongated terminal connectors 136 are inhibited from being linearly displaced in the longitudinal direction of the elongated terminal connectors 136.

In some embodiments and as shown in FIGS. 6A-6C, each first opening 52 of the plurality of keyed slots 51 extends through a thickness T2 of the elongated terminal connectors 36, and each second opening 54 of the plurality of keyed slots 51 extends through a thickness T3 of the elongated terminal connectors 36. While the thickness T1, thickness T2, and the thickness T3 are shown as uniform along the entirety of the elongated terminal connectors 36 in the longitudinal direction (i.e., in the +/−X direction), the thickness T1, thickness T2, and/or the thickness T3 may be non-uniform in the longitudinal direction (i.e., in the +/−X direction) in other embodiments. As a non-limiting example, the thickness T1 may be greater at each end 56 of the elongated terminal connectors 36 than a middle portion 58 of the elongated terminal connectors 36. As another non-limiting example, the thickness T2 may be greater at each end 56 of the elongated terminal connectors 36 than a middle portion 58 of the elongated terminal connectors 36.

The first width W1 and the second width W2 may be uniform through at least one of the thickness T1, the thickness T2, and the thickness T3 of the elongated terminal connectors 36 in the longitudinal direction (i.e., in the +/−X direction). In other embodiments, the first width W1 and the second width W2 may be non-uniform through at least one of the thickness T1, the thickness T2, and the thickness T3 of the elongated terminal connectors 36 in the longitudinal direction (i.e., in the +/−X direction).

Figure 7:
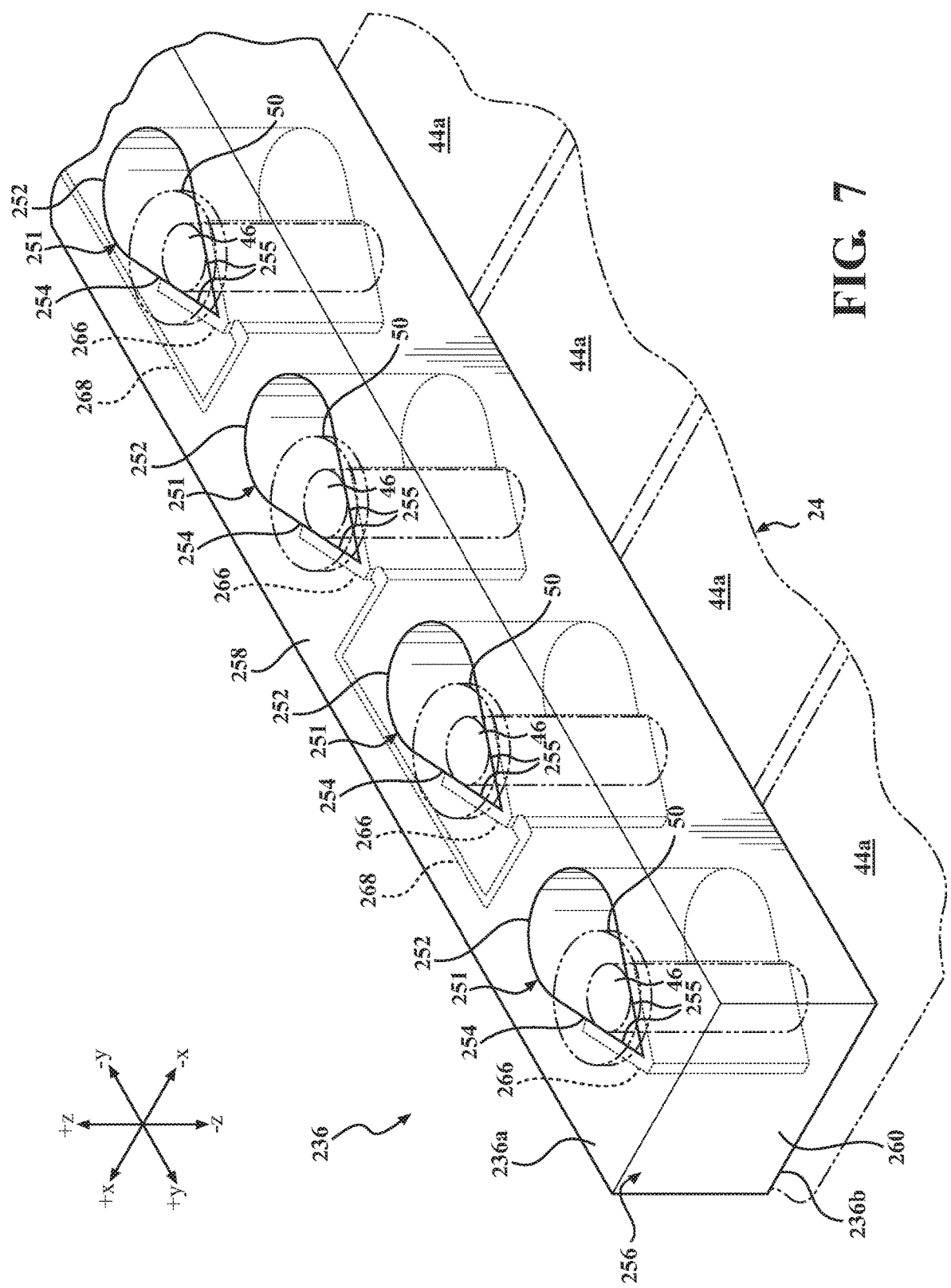
FIG. 7 schematically depicts a partial perspective view of another elongated terminal connector in an engaged position according to one or more embodiments described herein.

Now referring to FIG. 7, a third aspect of elongated terminal connectors 236 is schematically depicted. It is understood that the elongated terminal connectors 36 are similar to the elongated terminal connectors 36 with the exceptions of the features described herein. As such, like features will use the same reference numerals with a prefix "2" for the reference numbers. As such, for brevity reasons, these features will not be described again.

The elongated terminal connectors 236 include a plurality of keyed slots 251 having a plurality of first openings 252 and a plurality of second openings 254. The plurality of first openings 252 are similar to the plurality of first openings 52. The elongated terminal connectors 236 are similar to the elongated terminal connectors 36 except for the shape of the plurality of second openings 254.

In some embodiments and as illustrated in FIG. 7, each first opening 252 has a generally circular or semicircular shape, and each second opening 254 has a generally tapered or triangular shape formed by a pair of tapered edges 255. It should be understood that at least one of the first openings 252 illustrated in FIG. 7 may have a non-circular shape in other embodiments, such as a square shape, a rectangular shape, an octagonal shape, and the like. It should also be understood that at least one of the second openings 254 illustrated in FIG. 7 may have other shapes formed by at least one pair of tapered edges 255 in other embodiments.

Figure 8:
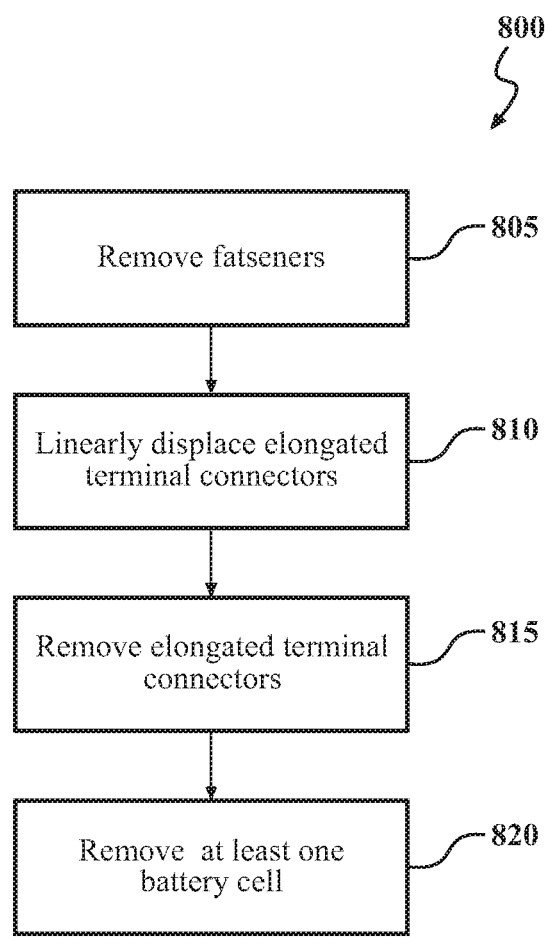
FIG. 8 depicts a flowchart of an illustrative method of removing a battery cell from a battery pack assembly according to one or more embodiments shown or described herein.

Now referring to FIG. 8, a flowchart of an illustrative method 800 of removing the battery cell from the battery pack assembly of FIG. 1 is depicted. The battery pack is an initial state in which the elongated terminal connectors are in the engaged position and the fasteners engage the opening and apertures to position the elongated terminal connectors in the locked position. At block 805, the pair of fasteners that extend through the elongated terminal connectors are removed. At block 810, the elongated terminal connectors are linearly displaced in one direction to move the elongated terminal connectors from the engaged position to the disengaged position such that that each terminal of the at least one terminal is aligned with the first opening of the at least one keyed slot. At block 815, the elongated terminal connectors are removed upwardly in the vertical direction from around the terminal of the battery cell when each terminal of the at least one terminal is aligned with the first opening of each keyed slot of the at least one keyed slot. At block 820, at least one battery cell of the plurality of battery cells is removed from the battery pack assembly.

The above described battery pack assembly provide for elongated terminal connectors that electrically connect each of a plurality of battery cells to a vehicle component while retaining the plurality of battery cells within a housing. The elongated terminal connectors are easily removed by removing a pair of fasteners and linearly displacing the elongated terminal connectors in one direction between an engaged position to a disengaged position such that that each terminal of the at least one terminal is aligned with the first opening of the at least one keyed slot. Once the elongated terminal connectors are removed from the battery pack assembly, each battery cell of the plurality of battery cells may be removed from the battery pack assembly.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A battery pack assembly comprising:
   a battery pack comprising a plurality of battery cells, each battery cell having at least one terminal; and
   an elongated terminal connector extending across a length of the battery pack, the elongated terminal connector comprising at least one keyed slot corresponding to each of the at least one terminal, each keyed slot of the at least one keyed slot comprising a first opening and a second opening, a first width of the first opening is greater than a second width of the second opening, the elongated terminal connector is configured to move between an engaged position and a disengaged position, in the engaged position each terminal of the at least one terminal is positioned within the second opening to engage each terminal with the elongated terminal connector, and in the disengaged position each terminal of the at least one terminal is positioned within the first opening to disengaged each terminal from the elongated terminal connector.

2. The assembly of claim 1, wherein:
the elongated terminal connector is removable from the battery pack in the disengaged position.

3. The assembly of claim 1, wherein:
when the elongated terminal connector moves from the engaged position to the disengaged position, a position of each terminal of the at least one terminal changes from within the second opening to within the first opening; and
when the elongated terminal connector moves from the disengaged position to the engaged position, the position of each terminal of the at least one terminal changes from within the second opening to within the first opening.

4. The assembly of claim 1, wherein each terminal of the at least one terminal comprises a post that extends upwardly from each battery cell and a flange extending radially outward from a distal end of the post, the flange having a diameter that is greater than the second width and less than the first width.

5. The assembly of claim 4, wherein:
when the elongated terminal connector is in the engaged position, the flange of each terminal of the at least one terminal abuts a surface of the elongated terminal connector; and
when the elongated terminal connector is in the engaged position, the flange of each terminal of the at least one terminal is positioned above the first opening.

6. The assembly of claim 1, wherein the second opening is defined by at least one tapered edge.

7. The assembly of claim 1, wherein:
the elongated terminal connector comprises at least one inclined portion and at least one pair of linear portions;
the first opening of each keyed slot of the at least one keyed slot is positioned on a first linear portion of a corresponding at least one pair of linear portion; and
the second opening of each keyed slot of the at least one keyed slot is positioned on a second linear portion of a corresponding at least one pair of linear portion.

8. The assembly of claim 7, wherein each keyed slot of the at least one keyed slot comprises a connecting slot in communication with the first opening and the second opening.

9. A vehicle comprising:
a battery pack positioned within the vehicle, the battery pack having a plurality of battery cells, each battery cell having at least one terminal extends from each of the plurality of battery cells; and
an elongated terminal connector extending across a length of the battery pack, the elongated terminal connector comprising at least one keyed slot, each keyed slot of the at least one keyed slot comprising a first opening and a second opening, a first width of the first opening is greater than a second width of the second opening, the elongated terminal connector is configured to move between an engaged position and a disengaged position, in the engaged position each terminal of the at least one terminal is positioned within the second opening to engage each terminal with the elongated terminal connector, and in the disengaged position each terminal of the at least one terminal is positioned within the first opening to disengaged each terminal from the elongated terminal connector.

10. The vehicle of claim 9, wherein
the elongated terminal connector is removable from the battery pack in the disengaged position.

11. The vehicle of claim 9, wherein:
when the elongated terminal connector moves from the engaged position to the disengaged position, a position of each terminal of the at least one terminal changes from within the second opening to within the first opening; and
when the elongated terminal connector moves from the disengaged position to the engaged position, the position of each terminal of the at least one terminal changes from within the second opening to within the first opening.

12. The vehicle of claim 9, wherein each terminal of the at least one terminal comprises a post that extends upwardly from each battery cell and a flange extending radially outward from a distal end of the post, the flange having a diameter that is greater than the second width and less than the first width.

13. The vehicle of claim 12, wherein:
when the elongated terminal connector is in the engaged position, the flange of each terminal of the at least one terminal abuts a surface of the elongated terminal connector; and
when the elongated terminal connector is in the engaged position, the flange of each terminal of the at least one terminal is positioned above the first opening.

14. The vehicle of claim 9, wherein the second opening is defined by at least one tapered edge.

15. The vehicle of claim 9, wherein:
the elongated terminal connector comprises at least one inclined portion and at least one pair of linear portions;
the first opening of each keyed slot of the at least one keyed slot is positioned on a first linear portion of a corresponding at least one pair of linear portion; and
the second opening of each keyed slot of the at least one keyed slot is positioned on a second linear portion of a corresponding at least one pair of linear portion.

16. The vehicle of claim 15, wherein each keyed slot of the at least one keyed slot comprises a connecting slot in communication with the first opening and the second opening.

17. A method of removing an individual battery cell from a battery pack having a plurality of battery cells, each battery cell having at least one terminal, the method comprising:
removing a first pair of fasteners from an elongated terminal connector, the elongated terminal connector having at least one keyed slot, each keyed slot of the at least one keyed slot comprising a first opening and a second opening, a first width of the first opening is greater than a second width of the second opening, each keyed slot of the at least one keyed slot receiving a corresponding terminal of the at least one terminal; and
displacing the elongated terminal connector linearly in a first direction such that each terminal of the at least one terminal is aligned with the first opening of each keyed slot of the at least one keyed slot;
removing the elongated terminal connector from around the terminal of the battery cell when each terminal of the at least one terminal is aligned with the first opening of each keyed slot of the at least one keyed slot; and
removing the individual battery cell from the battery pack.

18. The method of claim 17, wherein displacing the elongated terminal connector linearly in the first direction such that each terminal of the at least one terminal is aligned with the second opening of each keyed slot of the at least one keyed slot further comprises displacing the elongated terminal connector linearly such that each terminal of the at least one terminal moves from the second opening to the first opening via a connecting slot.

19. The method of claim 17, wherein each terminal of the at least one terminal comprises a post that extends upwardly from each battery cell and a flange extending radially outward from a distal end of the post, the flange having a diameter that is greater than the second width and less than the first width.

20. The method of claim 17, wherein the elongated terminal connector extends across a length of the battery pack.

\* \* \* \* \*